INVENTOR.
ARCHIBALD McILHENNY
BY
Woodcock and Phelan
ATTORNEYS

May 18, 1954     A. McILHENNY     2,679,022
TRANSFER FROM MANUAL TO AUTOMATIC CONTROL
IN AUTOMATIC CONTROL SYSTEMS
Filed Nov. 13, 1951     5 Sheets-Sheet 2
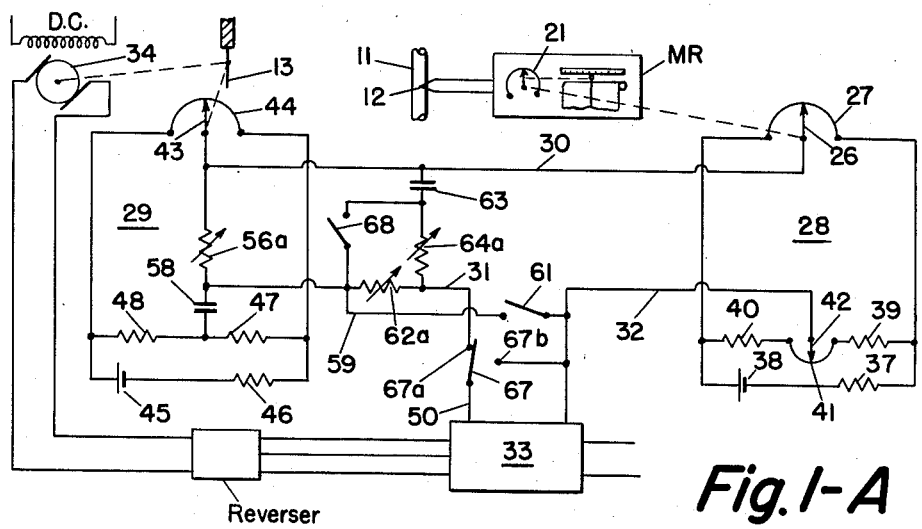
*Fig. I-A*
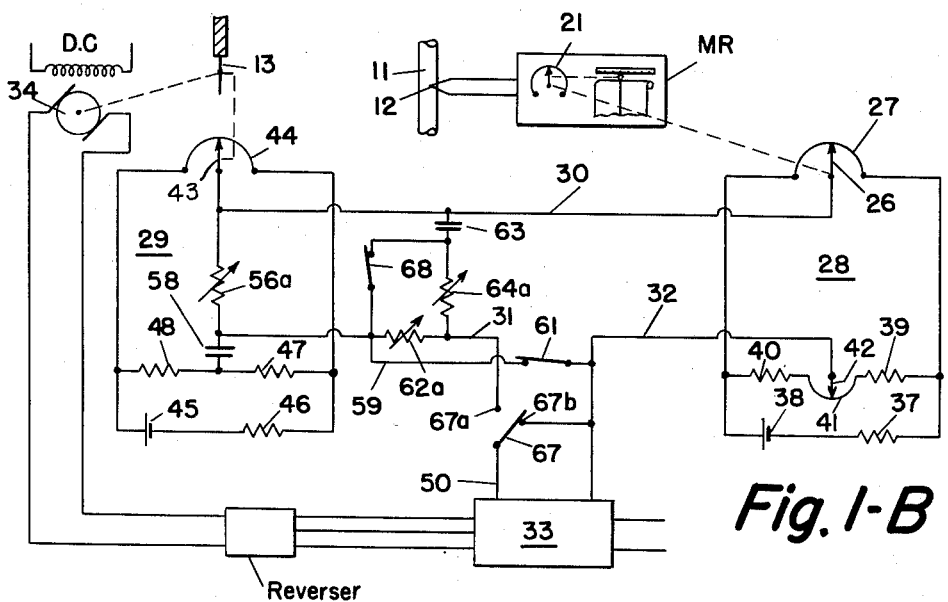
*Fig. I-B*
INVENTOR.
ARCHIBALD McILHENNY
BY
Woodcock and Phelan
ATTORNEYS INVENTOR.
ARCHIBALD McILHENNY
BY
Woodcock and Phelan
ATTORNEYS

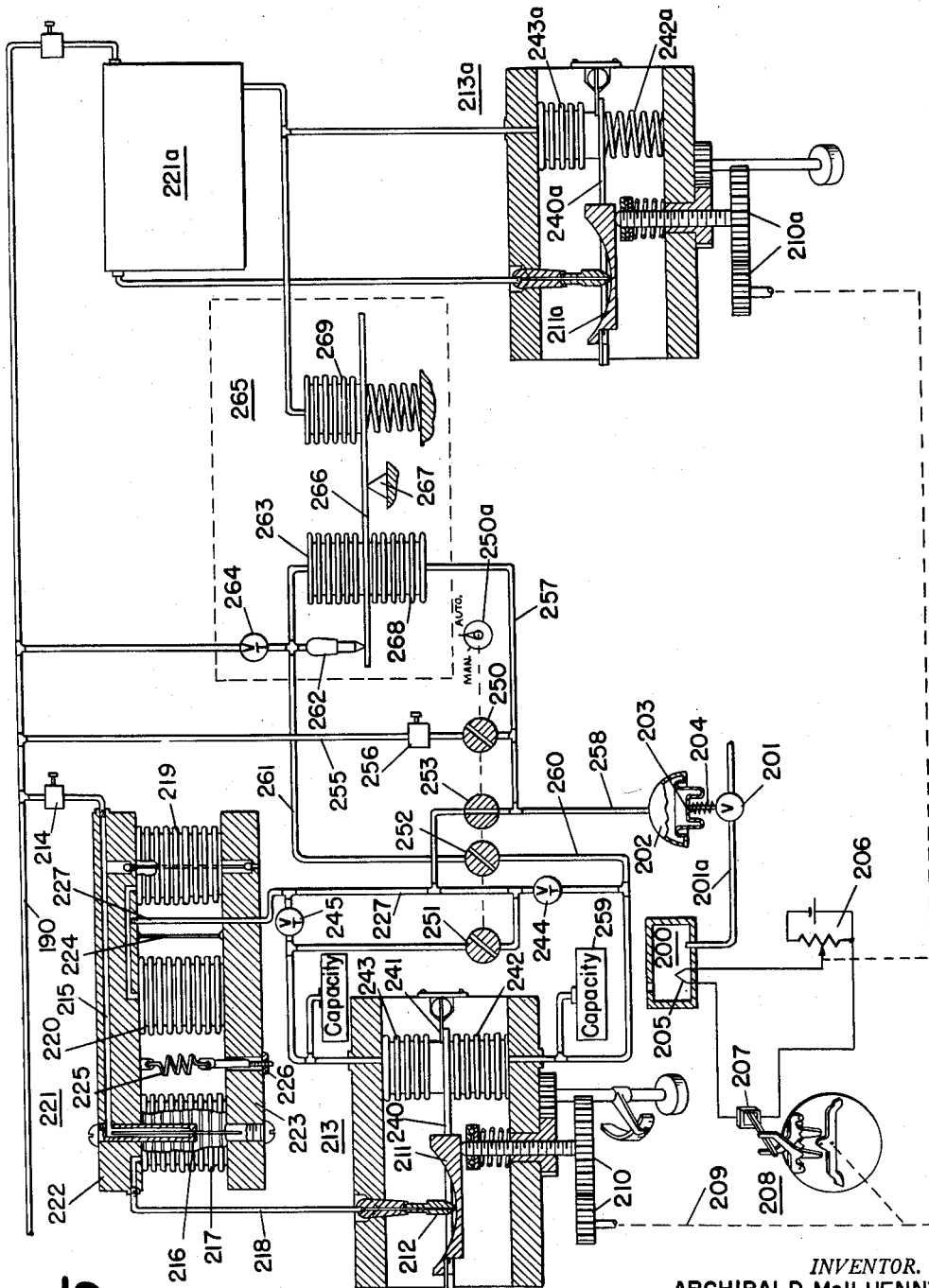

Patented May 18, 1954

2,679,022

UNITED STATES PATENT OFFICE 2,679,022

TRANSFER FROM MANUAL TO AUTOMATIC CONTROL IN AUTOMATIC CONTROL SYSTEMS

Archibald McIlhenny, Willow Grove, Pa., assignor to Leeds and Northrup Company, Philadelphia, Pa., a corporation of Pennsylvania Application November 13, 1951, Serial No. 256,003

17 Claims. (Cl. 318—28)

This invention relates to automatic control systems of the type used for controlling the magnitude of a variable quantity or condition such as temperature, pH values, rate of flow or other physical, chemical, or electrical conditions or characteristics and having a storage element providing a time-function control and has for an object the provision of methods and apparatus for transferring from manual to automatic control at any point within the control range without introduction of a transitory control effect due to the transfer.

The present invention is applicable to balanceable control systems of the automatic type whether operative by pneumatic or electrical means which includes storage capacity means for modifying the operation of the control system in accordance with a time function of the departure of the condition or characteristic under control from the control point. Such a storage capacity means may be utilized in a balanceable control system for the introduction of automatic reset control action or automatic rate control action either of which in conjunction with a proportional mode of control produces a control action varying as a time function of the departure of the condition from the control point. Where the storage capacity means is used for introducing reset control action, the time function is an integral time function of the departure of the condition, but where the capacity means is used for rate action, the time function is a derivative time function of the departure. It is well understood in the automatic control art that either a rate control action or a reset control action may be used alone with a proportional mode of control or both rate and reset control actions may be used together with the proportional control action. While reset and rate control actions are highly desirable in automatic control systems of the balanceable type, the storage capacity means used to introduce such action, prior to the present invention, has complicated the transfer from manual control to automatic control, by introducing a sudden change in the position of the condition-varying element, such as a valve controlling the flow of heat to a furnace. This sudden change in position is due solely to the operation of transferring from manual to automatic control. Such movement of the valve is due to the fact that in the control of a process, such as a furnace or the like, manual control of the condition-varying means is most frequently desired at the time when the condition under control has deviated from the desired predetermined value, generally referred to by those skilled in the art as the control point. Upon attempting to return to automatic operation of the control system while the condition is away from the control point, it has been found that the condition-controlling or varying element may be caused to move solely due to the transfer. Such a sudden change in the condition-varying element may and sometimes does upset the system so that a substantial time may be required before smooth control is reestablished.

While previously proposed systems of automatic control have provided means for transferring from automatic to manual operation with little or no disturbance of the process under control even though the controlled condition be away from the control point, the transfer from manual or automatic means could only be made either with the controlled characteristic or condition at the control point or after complicated manipulation of various controller elements if it were desired to avoid disturbances of the process under control. Such manipulations require the operator of the process to have special training so that he can understand the effects of each adjustment upon the system. This requirement is primarily due to the fact that storage capacity means are used for introducing a time function of the departure of the controlled condition from the control point automatically into the control signal. A control signal responsive means, such as an amplifier and an electric motor, or a diaphragm element for operating a valve in a pneumatic system is then controlled by the control signal which has present therein a quantity representative of that time function of the departure. While recognizing the necessity for accounting for these time functions in transferring from manual to automatic control at other than the control point, other control systems of the type herein referred to require additional manipulation of the automatic control means to equate the automatically applied signal introduced by said control means to the signal being applied manually. Such systems require adjustment of the automatic signal prior to the time that transfer from manual to automatic can be made to prevent undue disturbance of the final control element.

In carrying out the present invention, there is provided means for transferring control of the condition-varying element from a manual control means to a signal-responsive means which includes means for continuously and simultaneously applying to the storage capacity means a control quantity variable in accordance with the deviation of the characteristic under control from a control point and another control quantity variable in accordance with the movement of the condition-varying element while under control of the manual control means.

In a preferred form of the invention, there is provided a balanceable control system of the electrical type including a first network having a circuit element, such as a slidewire, adjustable in accordance with the magnitude of the condition under control to produce an electrical signal and a second electrical network including an adjustable circuit element, such as another slidewire, adjustable in response to movement of a condition-varying means, such as a valve. Said second electrical network includes therein a reset resistor, a reset capacitor, a rate capacitor and a rate resistor. Provision is made for connecting the output of the networks and the signals developed therein in series circuit with signal responsive means, such as an amplifier and a motor, for automatically controlling the operation of said condition-varying means. Further in accordance with the invention circuit controller means are provided for preventing operation of the signal responsive means and for connecting said rate capacitor and said reset resistor directly across the output terminals of the first network. In this way, the rate capacitor has applied thereto during manual control of the final control element, or condition-varying means, a voltage signal produced in the first network corresponding to the deviation of the controlled condition from the control point. Similarly, the reset capacitor has a voltage signal applied thereto which is the algebraic sum of the voltages corresponding to said deviation and the position of the final control element. Upon return of the circuit controller to its original position for automatic control of the condition-varying means, the charge on said rate and reset capacitors produces a signal equal and opposite to the signal of said first network to prevent immediate adjustment of the condition-controlling means.

For further objects and advantages of the invention and for a detailed description of further novel features, reference is to be had to the following description taken in conjunction with the accompanying drawings in which:

Fig. 1 diagrammatically illustrates a system including one form of apparatus to which the invention has been applied;

Fig. 1-A diagrammatically illustrates a simplified form of the control system illustrated in Fig. 1 with the balanceable control system connected for automatic control of a final control element;

Fig. 1-B is a diagrammatic illustration similar to Fig. 1-A with the control system connected for manual control of a final control element;

Fig. 5 diagrammatically illustrates the application of the present invention to a balanceable control system of the pneumatic type.

Figure 1:
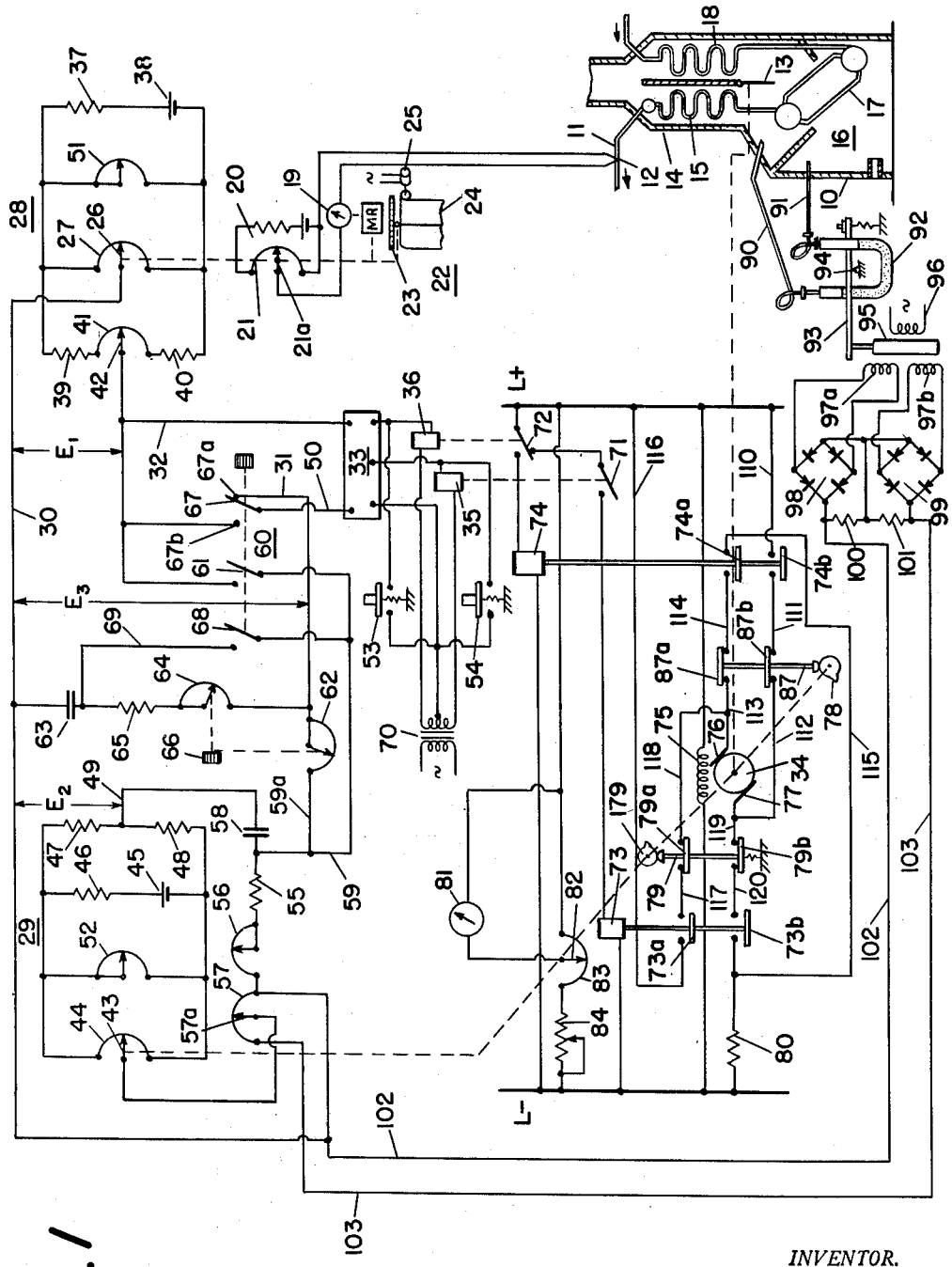

Referring to Fig. 1, the invention has been shown as applied to a balanceable control system of the electrical type which is arranged to control the superheat temperature of steam generated in a furnace 10. The superheat temperature of steam generated by furnace 10 is to be taken as representative of any measured variable, condition or characteristic, the magnitude of which is to be controlled either by automatic or manual means. As shown, the measured variable is the temperature of the superheated steam flowing in line 11 as measured by thermocouple 12. The temperature of the superheated steam in line 11 is varied by changing the position of a condition-varying element, the damper 13, provided for controlling the quantity of hot combustion gases passing through the furnace stack 14 in heat-exchange relationship with a superheater coil 15. As shown, furnace 10 includes a fire box 16, a boiler section 17 and a fuel economizer 18. In control of the temperature and pressure of steam delivered by way of line 11, it is well understood by those skilled in the art that upon a decrease in temperature, as measured by thermocouple 12, there will be required increased flow of combustion gases generated in fire box 16 over coil 15. While the control of the rate of flow of fuel and combustion air to furnace 10 may be controlled by other suitable means, upon a decrease of heat supplied to the superheater coil 15, it is necessary that the damper 13 be adjusted to maintain the temperature of superheated steam from coil 15 substantially constant. Accordingly, the damper 13 is so adjusted that the percentage of the volume of combustion gases flowing through the superheater section of the furnace stack 14 is adjusted to compensate for any increase or decrease in the total volume of furnace gases supplied by furnace 10. When the condition-varying element, damper 13, is under automatic control, said element is automatically moved in a direction to return the measured variable or variable condition, temperature, to a predetermined magnitude.

As shown, the temperature of the superheated steam in line 11 is measured by means of thermocouple 12 which is connected to a suitable measuring circuit which includes a galvanometer 19 and a balanceable network 20 having a slidewire 21 and a variable contact 21a relatively positionable in a direction to balance the thermocouple voltage. Such balance is achieved by means of a mechanical relay MR mechanically coupled to galvanometer 19. While any suitable measuring arrangement may be utilized, the system illustrated is of the type disclosed in Squibb Patent No. 1,935,732. With an arrangement of the type shown in the Squibb patent, a change in the temperature of line 11 causes a deflection of galvanometer 19 which in turn actuates mechanical relay MR to adjust the position between slidewire 21 and contact 21a to restore balance of measuring network 20. Simultaneously mechanical relay MR may actuate a recording and indicating means 22 to provide an indication on scale 23 and a record on chart 24. Chart 24 is driven by a synchronous motor 25 energized from any suitable source.

Simultaneously with movement of movable contact 21a in response to changes in temperature of the superheater line 11, provision is made for moving an adjustable circuit element 26 with respect to a slidewire 27 in an electrical network designated generally as control network 28. Control network 28 is interconnected with a second control network 29 by way of line 30 and together networks 28 and 29 form a balanceable control system having an output circuit provided by way of lines 31 and 32 which are connected to the input terminals of an amplifier 33, preferably of the high impedance, high gain type. Amplifier means 33 together with motor 34 whose direction of rotation is controlled by amplifier 33 by way of forward and reverse relays 35 and 36 form a responsive means to which there is applied the control signals developed by unbalance between control networks 28 and 29 to vary the position of damper 13 in the furnace 10. This responsive means operates to move said damper in a direction to maintain the magnitude of the temperature in line 11 at a predetermined value and to reduce the control signals to substantially zero, thereby balancing the output of control networks 28 and 29.

With reference to network 28, it will be observed that control slidewire 27 is connected through a resistor 37 to a source of power, shown as battery 38. There is likewise connected in parallel with slidewire 27 a branch circuit including resistors 39 and 40 and a slidewire 41. One or both of the resistors 39 and 40 may be omitted if desired. As shown, line 32 which serves to connect one input terminal of the amplifier 33 and one output terminal of network 28 is connected to a movable contact 42 cooperating with slidewire 41. Thus, it will be seen that upon adjustment of contact 26 with respect to control slidewire 27, a voltage $E_1$ is developed between conductors or lines 30 and 32 since these lines are connected to the movable contacts 26 and 42 on slidewires 27 and 41, respectively. As the relative position of contact 42 on slidewire 41 for bridge balance determines the position of contact 26 relative to slidewire 27, contact 42 may be used to determine the control point of the system.

With reference to slidewire such as 21, 27 and 41, it is possible in practice either to make the associated contacts 21a, 26 and 42 movable with respect to the slidewire or to make the slidewires movable with respect to the contact. However, for simplicity and uniformity in the wiring diagram, each contact associated with the slidewire resistors of the networks has been illustrated as adjustable.

In order to make the control system including networks 28 and 29 balanceable, that is, so that the signal appearing at the input terminals of amplifier 33 is substantially zero, provision is made for motor 34 to drive a movable contact 43 with respect to a slidewire 44 connected in the second control network 29. As shown, slidewire 44 is connected to a source of power, such as battery 45, by way of a resistor 46. There is likewise connected in parallel with slidewire 44 a voltage-dividing circuit including resistors 47 and 48, to the common junction of which there is connected a line 49. As is well understood by those skilled in the art, if line 49 were connected directly to the other input terminal of amplifier 33, by way of line 50 connected thereto, networks 28 and 29 forming a balanceable control system would provide a proportional control action. That is to say, for a given adjustment of contact 26 with respect to control slidewire 27, by mechanical relay MR, there would be a corresponding follow-up adjustment of motor 34 to move damper 13 and contact 43 with respect to the slidewire 44. If the voltages across slidewires 27 and 44 are equal, a given angular movement of contact 26 would produce an equal angular adjustment of contact 43. Mathematically, for a given change in the variable condition or characteristic, $\theta$, the adjustment of slidewire contact 43 and damper 13 will be equal to $K_1\theta$ where $K_1$ is the proportional action constant. In order to provide adjustment of the proportionality, slidewire resistors 51 and 52 respectively are connected in parallel with slidewires 27 and 44. If then resistor 51 is set to make the voltage across slidewire 27 greater than that across slidewire 44, a greater relative movement of contact 43 with respect to slidewire 44 would be required to produce a voltage $E_2$ between line 49 and line 30 equal to the changed value of voltage $E_1$ between lines 30 and 32. The adjustment of either resistor 51 or 52 is referred to as throttling range or proportional band adjustment. In practice, resistors 51 and 52 may be mechanically linked for simultaneous adjustment in opposite directions so that movement of the movable arms will produce maximum change in the proportional band.

In balanceable control systems of the type shown in Fig. 1, there is introduced a reset control action by means of a reset resistor including a fixed resistance 55 and a variable resistance 56 connected to line 30 and to movable contact 43 through a slidewire 57 whose function will be described in detail hereinafter. In addition to the reset resistor provided by resistance sections 55 and 56, a reset capacitor 58 is connected between line 49 leading to the common junction between resistors 47 and 48 and the opposite end of the reset resistor. Capacitor 58, resistor 55 and slidewire resistor 56 introduce a correction for droop resulting from changes in load conditions on the process under control where the mode of control includes only proportional action. Such correction is introduced to maintain the magnitude of the condition or the variable characteristic at a predetermined value notwithstanding changes in load on the controlled condition. This correction is referred to by those skilled in the art as reset or droop-corrective action, meaning a corrective action which prevents permanent decrease in the variable characteristic with rising load. Mathematically, the reset action may be expressed as a correction of magnitude corresponding with the summation with respect to time of the deviation of the condition from a predetermined value. The action is equal to $K_2\int\theta dt$ where $K_2$ is a constant and $dt$ is the time differential increment.

Figure 2:
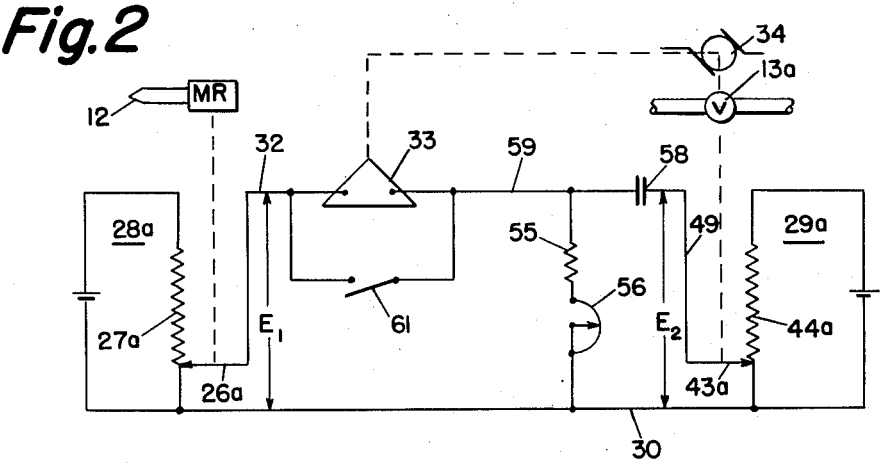
Fig. 2 is a fragmentary diagram of a simplified form of a control system useful in the understanding of the operation of Fig. 1 and illustrating application of the present invention to a balanceable control system including electrostatic storage capacity means for introducing a reset control action.

In further explanation of such reset action plus proportional action, reference may be had to Fig. 2 wherein similar numbers have been used to identify elements similar in function to those illustrated in Fig. 1. However, the system of Fig. 2 has been represented as having potentiometer circuits 28a and 29a replacing the bridge networks 28 and 29. As shown the potentiometer circuit 28a includes a potentiometer 27a and a movable contact 26a. The contact 26a is movable in response to a change in the condition under control, such as temperature as measured by thermocouple 12 so that a voltage $E_1$ is produced variable in accordance with the condition under control. The network 29 of Fig. 1, in Fig. 2 represented by potentiometer circuit 29a, includes a slidewire 44a and movable contact 43a whose position along the slidewire is controlled in accordance with the position of the final control element, represented as valve 13a. Valve 13a is movable in response to the signal responsive means, including amplifier 33 and motor 34. The control point in the schematic system shown in Fig. 2 corresponds with the lower end of slidewire 27a.

By reason of capacitor 58 being in circuit with slidewire 55 and resistor 56, motor 34 functions to move movable contact 43a at a speed to maintain the voltage across resistors 55 and 56 equal to the voltage $E_1$ between conductors 30 and 32. In order to so maintain the voltage across resistors 55 and 56, it is required that there be a constant current flowing through them. However, by reason of capacitor 58 being in circuit with network 29a, movement of contact 43a must produce a gradually increasing voltage across resistors 55 and 56 and capacitor 58 to maintain a constant current flow, since capacitor 58 gradually accumulates a charge resulting in an increase in potential across it, due to the current flow therethrough. In consequence, the motor 34 will be progressively energized to move contact 43a along slidewire 44a to meet the foregoing requirements. Thus, motor 34 will be operated so long as there is departure from the value of the controlled condition from its predetermined value, generally referred to as the control point. Accordingly, adjustment of motor 34, valve 13a and contact 43a will be in accordance with the sum of first, the deviation of the condition from the control point, and, second, the time summation of the deviation of the variable condition from the control point. However, it is to be emphasized that whenever motor 34 moves contact 43a relative to slidewire 44a to a position required for balance, that is, when the voltage across resistances 55 and 56 is equal to the voltage $E_1$ between conductors 30 and 32, the motor will be deenergized since the input signal will be substantially zero. The control action is generally by a series of steps or intermittent operations of the control motor 34 to produce an average resultant rate of motion proportional to the deviation of the controlled variable from the control point.

As mentioned above, the introduction of reset control action in the system shown in Fig. 1, is highly desirable in the operation of motor 34 and damper 13 with automatic control thereof. However, when it is desired to control the position of motor 34 and damper 13 by manual means, such as by push button switches 53 and 54, such manual control, due to the mechanical linkage between motor 34 and contact 43, will introduce a voltage across reset resistors 55 and 56, which in turn will place a charge on reset capacitor 58, dependent upon the position of the final control element. Upon return of the control from manual means to automatic means including amplifier 33 and the balanceable control system, there is introduced a control signal of magnitude dependent upon the amount the condition under control is away from its control point. Such a signal will, of course, cause motor 34 to operate immediately in a direction to reduce that signal, and, hence, there is caused movement of motor 34 and damper 13 by transferring control from manual to automatic means unless that transfer be made at a point where the controlled condition is at its predetermined value.

It is well understood in the control system art that the automatic controller is "tuned" by adjustment of the proportional action and the reset action so that the condition under control will be returned to the control point as rapidly as possible without undue oscillation. Under these conditions, the sudden introduction of a spurious control signal, as described above, may introduce wide and undesirable oscillation of the controlled variable about the control point.

In accordance with the present invention, means are provided for preventing undesirable oscillation of the controlled variable by preconditioning the balanceable control system so that it will be balanced at the time of transfer from manual to automatic control, irrespective of the magnitude of the condition under control. For this purpose, a circuit-controller, designated generally as 60, Fig. 1, includes a switch 61, Figs. 1 and 2, for interconnecting lines 32 and 59 during such time as the condition-varying element is under manual control by push button switches 53 and 54, Fig. 1. In this way there is during manual control continuously applied to storage capacity means 58 the algebraic sum of signals $E_1$ and $E_2$.

Reference is again made to Fig. 2 wherein the operation of a control system including only proportional action and reset action is particularly shown. If valve 13a be moved from the illustrated position as above described, voltage $E_2$ will be developed between contact 43a and line 30 from potentiometer resistor 44a. Upon manual control of valve 13a switch 61 is closed to bypass high impedance amplifier 33 and to apply between conductors 30 and 59 voltage $E_1$. If voltage $E_1$ be different from $E_2$, the capacitor 58 will acquire a charge equal to the difference between said voltages. However, upon opening the switching 61 to return the system to automatic control, the algebraic sum of the voltage due to the charge acquired by capacitor 58 and voltage $E_2$ will always be equal to voltage $E_1$ which existed at the time of opening of switch 61. Accordingly, whenever switch 61 is opened to return the system from manual to automatic control, the difference voltage applied to the amplifier 33 is substantially zero. Therefore, valve 13a is not immediately moved and there is achieved transfer from manual to automatic control at any point within the control range without introduction of transitory control effects due to the transfer. However, after transfer to automatic control, the reset control action normally introduced by resistors 55 and 56 and capacitor 58 will produce a position-change of valve 13a dependent upon the time deviation of the controlled variable from the control point.

In the system of Fig. 1, there is also provided rate control action, that is to say, an adjustment of damper 13 by motor 34 is made in accordance with the rate of change of the variable condition. Such action is introduced by means of slidewire resistor 62 and capacitor 63.

Mathematically, the rate control action may be expressed by saying that there is provided a component in the adjustment of damper 13 equal to $$K_3 \frac{d\theta}{dt}$$

where $K_3$ is a constant. This circuit likewise includes a slidewire resistance 64 and a fixed resistance 65. As indicated, slidewire resistances 62 and 64 may be mechanically coupled for dual adjustment by means of knob 66 in accordance with the system disclosed in application Serial No. 149,775, filed March 15, 1950 by Elwood T. Davis, a coemployee, issued January 12, 1954 as U. S. Patent No. 2,666,170. As shown, resistor 62 is in series with the input terminal of amplifier 33 connected by way of line 50 through line 31 and the right-hand contact 67a of switch means 67 of circuit-controller 60. As thus connected, the input signal through line 50 is attenuated so that the voltage produced across resistors 55 and 56 must be made greater by an amount equal to that attenuation in order to produce across conductors 30, 31, a signal voltage equal to the voltage $E_1$. As explained in said application, the relative movement of contact 43 on slidewire 44 will include a component due to the rate of change of the variable condition under control.

In brief, as contact 43 is moved by motor 34 in response to a continuous change in the controlled variable, a voltage is developed between lines 30 and 59a. This results in a flow of charging current through slidewire resistor 62, slidewire resistor 64, and resistor 65 to capacitor 63. Since there will be a voltage drop in slidewire resistor 62, the movement of contact 43 will be advanced by an amount relative to the deviation from the control point needed to overcome the attenuation due to slidewire resistor 62 in order that the voltage between conductors 31 and 30 shall be equal and opposite to the voltage between conductors 30 and 32. If the controlled variable be rapidly changing, then the contact 43 will be rapidly moved. The rate of change of voltage will, therefore, be increased and with the increased rate of change of voltage there will be an increased current flow through slidewire resistor 62 to increase the attenuation and to increase the movement of contact 43 in order to achieve balance. Hence, the effect of resistor 62 and of the branch including the capacitor 63 is to cause an additional movement of damper 13 and contact 43 in accordance with the rate of change of the controlled variable.

If upon transfer from manual to automatic, the controlled variable be away from the control point, there will be present a difference voltage which will be applied in toto to the amplifier 33 (a step function) to produce rapid movement of contact 43. A step function even of small magnitude will, due to the rate action introduced by resistor 62 and capacitor 63, cause the motor 34 to operate the damper 13 either to fully opened or fully closed position.

To prevent this undesired action, a third switch means 68 is provided in circuit-controller 60 so that voltage $E_1$ is applied directly across rate capacitor 63 during such time as the condition-varying element is under manual control. As shown, switch means 68 provides a connection between line 59 and the junction between fixed resistor 65 and capacity means 63 by way of conductor 69 connected thereto.

It will be noted that for automatic operation of the control system, switch means 67 provides a connection through contact 67a between line 50, connected to one input terminal of amplifier 33, and line 31, connected to the junction between resistors 62 and 64. Contact 67b of switch 67 serves to short-circuit the input terminals of amplifier 33 by connecting line 50 to line 32 when circuit-controller 60 is to the left, as seen in Fig. 1, for manual operation of the final control element.

Figure 3:
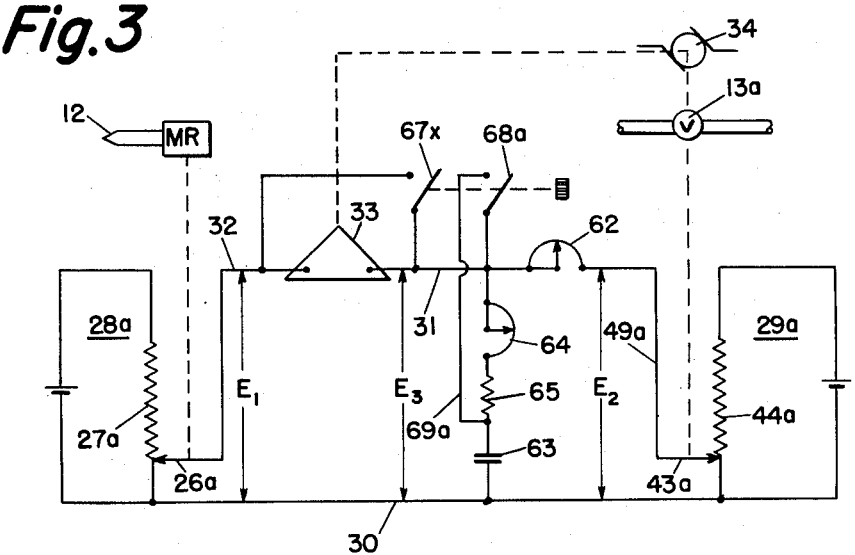
Fig. 3 is a fragmentary diagram similar to Fig. 2 useful in understanding the operation of Fig. 1 and illustrating the application of the present invention to a balanceable control system wherein rate control action is introduced.

In Fig. 3, there is illustrated the applicability of the present invention to a system incorporating only rate action in addition to proportional control action. However, in the system of Fig. 3, there is included a pair of switch means, for example switches 67x and 68a. In this arrangement switch 67x provides a connection around amplifier 33 for both shorting the amplifier and supplying the voltage $E_1$ from network 29a to line 31. However, as distinguished from the embodiment of Fig. 1, provision is made for only short-circuiting resistors 64 and 65 while variable resistor 62 is retained in the series circuit network connected to control network 29a. By this arrangement it will be observed that when the circuit-controller means is moved so that switches 68a and 67x are closed, the voltage $E_1$ is applied directly across the rate capacitor 63 and is so retained throughout the time that the final control element is being manipulated by manual means. In the simplified form shown in Fig. 3, the final control element is illustrated as a valve 13a in a flow line supplying heat to modify the temperature of thermocouple 12. Upon return to automatic control of valve 13a and in response to amplifier 33 and motor 34, the voltage across capacitor 63 initially will be equal to the voltage $E_1$, corresponding to the controlled variable. Resistors 64 and 65 may attenuate the voltage from capacitor 63 so that the voltage $E_3$ appearing between conductors 30 and 31 may differ slightly from the voltage $E_1$. The difference in voltages $E_1$ and $E_3$ is applied to the input terminals of amplifier 33 and causes motor 34 to adjust the position of valve 13a and the position of contact 43a on slidewire 44a. The adjustment of contact 43a will be to an extent to restore the proportional relationship between the value of the controlled condition and the position of the final control element.

However, since the voltage produced by the charge on capacitor 63 at the time of transfer is equal to voltage $E_1$, immediately after the transfer and upon the instant of opening of switch 67x the voltage across capacitor 63 is equal and opposite to voltage $E_1$. At the instant of transfer, including the opening of switch 68a, any difference in voltage between that across capacitor 63 and between contact 43a and conductor 30 divides between slidewire resistor 62 and the combined resistance of slidewire resistor 64 and resistor 65. The movement of contact 43a is in a direction to reduce the voltage difference. The action is rapid and capacitor 63 loses very little of its charge before voltage balance is reestablished with $E_3$ equal to $E_1$. In this manner there is avoided any substantial disturbance of the system due to rate action upon operation of the transfer switch from manual to automatic.

Referring now to the control circuit for motor 34, Fig. 1, it will be seen that relays 35 and 36 may be selectively connected to a source of power, such as transformer 70, either by amplifier 33 or by push-button switch means 53 and 54. As shown, the relays have one side of their coils connected to the opposite ends of the secondary winding of transformer 70, while the center tap is connected to the amplifier and the contacts of switches 53 and 54. Relays 35 and 36 in turn control switch means 71 and 72 to connect relays 73 and 74 respectively across direct-current power lines, designated as L+ and L−. Motor 34 is preferably of the shunt-connected type having a field winding, designated generally as 75, connected directly between lines L+ and L− so that the direction of rotation of motor 34 is dependent upon the polarity of the direct-current energy supplied to brushes 76 and 77 connected to the armature of motor 34. As illustrated, relay 74 is provided with a pair of contacts 74a and 74b which are arranged to connect brushes 76 and 77 to lines L— and L+, respectively, through contacts 87a and 87b of limit switch 87, operable by cam 78 which is mechanically coupled to motor 34. This circuit may be traced from L+ to L— through line 110, contact 74b, conductor 111, contact 87b, conductors 112 and 119, brush 77, the armature of motor 34, brush 76, conductor 113, contact 87a, conductor 114, contact 74a, conductor 115 and resistor 80 to line L—.

For rotation of motor 34 in the other direction, relay 73 by means of contacts 73a and 73b is arranged to connect brush 76 to line L+ and brush 77 to line L—. The connections to lines L+ and L— are made by way of contacts 79a and 79b of limit switch 79 which is operable in response to the position of cam 179, mechanically coupled to motor 34. This circuit may be traced from L+ through conductor 116, contact 73a, conductor 117, contact 79a, conductors 118 and 113, brush 76, the armature of motor 34, brush 77, conductor 119, contact 79b, conductor 120, contact 73b and resistor 80 to line L—. It will be observed that the connection of the armature of motor 34 to line L— for rotation in either direction is made through a current-limiting resistor 80.

The position of the final control element, damper 13, may be indicated by a meter, such as voltmeter 81, connected to a movable or adjustable contact 82 variable in position along a slidewire 83 in response to movement of motor 34 and damper 13. As shown, slidewire 83 may be connected directly between lines L+ and L— through an adjustable voltage-dropping resistor 84. It will be apparent to those skilled in the art that the voltage across meter 81 may be made to vary in accordance with the position of damper 13 so that the indicating scale on meter 81 may be calibrated in accordance with that position. The calibration of meter 81 may be made by adjustment of resistor 84.

As mentioned hereinbefore the connection between adjustable contact 43 and slidewire resistor 56 is made through a slidewire 57 and a movable contact 57a. In the embodiment of Fig. 1, slidewire 57 is provided to introduce a further electrical control signal or quantity representative of another variable condition. In the present arrangement, the flow of combustion air in fire box 16 may be taken as the other variable condition. The flow of combustion air is measured by draft tubes 90 and 91 connected to a tilting U-tube manometer 92 mounted upon a lever arm 93 supported for rotation upon a pivot 94. By reason of the difference in pressure detected by tubes 90 and 91, the fluid, such as mercury, in U-tube 92 is caused to assume a difference in elevation in the two legs of the tube, as illustrated. Lever arm 93 positions a core member 95 mounted adjacent the outer end thereof with respect to a primary coil 96 and a pair of secondary coils 97a and 97b. Primary coil 96 may be connected to a suitable source of alternating current so that secondary windings 97a and 97b are energized in accordance with the flux linkage between the primary and secondary coils by movable core 95. The position of core member 95 effectively controls the flux and the magnitude of voltage produced in each of the secondary windings 97a and 97b. Full wave rectifiers 98 and 99 are respectively connected to secondary windings 97a and 97b. The alternating voltage developed in each of the coils may be converted to a direct-current signal by rectifiers 98 and 99 and applied to voltage-dividing resistors 100 and 101 so that there is provided a direct-current signal between lines 102 and 103 whose magnitude and sense is determined by the position of core 95 in accordance with the difference in pressure between draft tubes 90 and 91. While the full direct-current signal between lines 102 and 103 may be introduced into the resistance-capacitance network including the reset resistors 55 and 56 and capacitor 58, along with the output of control network 29, provision is made by movable contact 57a to introduce any desired portion of this additional control signal, from zero to the full potential difference appearing across slidewire 57. The foregoing circuit is illustrative of numerous modifications of other balanceable control systems which may be utilized in connection with the present invention. However, the introduction, or exclusion, of such additional control signals forms no part of the present invention, systems of this type being described and claimed in a copending application, filed February 14, 1952, Serial No. 271,486, which is a continuation-in-part of Serial Nos. 149,775 and 256,070, of Elwood T. Davis, a coemployee.

Reference is now made to Figs. 1-A and 1-B, wherein there is illustrated a further simplified form of the apparatus shown in Fig. 1, useful in understanding the operation of the system of Fig. 1 since the positions of circuit-controller switches 61, 67 and 68 have been rearranged in Figs. 1-A and 1-B to identify more clearly their functions in the operation of transferring from manual to automatic control of the condition-varying element, damper 13, without upset of the automatic control system and the switches are shown in different circuit-controlling positions. In Fig. 1-A, the circuit-controller switches are connected for automatic control of the final control element by the responsive means including amplifier 33 and motor 34. In order to simplify further the explanation of the operation of the system of Fig. 1, the reset resistor has been identified as a variable resistor 56a and the rate resistor has been illustrated as variable resistor 62a.

In accordance with the present invention, switches 61, 67 and 68 have been provided which may be operated to the position shown in Fig. 1-B during manual control of the final control element so that transfer from manual to automatic control may be made at any point within the throttling range or proportional band without "bump," i. e. a sudden movement of the condition-varying element due solely to the transfer. As particularly shown in Fig. 1-B, the signal generated by network 28 which is representative of the condition or characteristic under control is continuously applied across reset resistor 56a and rate capacitor 63 and at the same time the algebraic sum of the control signals produced by networks 28 and 29 is applied to reset capacitor means 58. By these circuit provisions, when the switch contacts are restored to their automatic position as shown in Fig. 1-A, there is established between lines 30 and 31 by capacitor 63 a voltage equal and opposite to the voltage between lines 30 and 32 to produce a difference voltage therebetween of substantially zero. That difference voltage, the input voltage to amplifier 33 being substantially zero, no abrupt motion will be produced by motor 34 until such action is produced by the automatic control means in response to deviation of the condition under control from the set point or control point. Hence there is achieved "bumpless" transfer of the control element from manual to automatic control at any point within the throttling range.

As mentioned hereinbefore, the present invention may be utilized in systems incorporating both reset and rate control actions with proportional control action as in Fig. 1. However, as shown in Fig. 2, the invention is likewise applicable to a system incorporating only reset control and proportional control actions by providing a single circuit-controlling switch 61 for simultaneously short-circuiting the input to amplifier 33 and applying the voltage $E_1$ generated in network 28a to reset capacitor 58 and reset resistors 55 and 56 as described hereinabove. Likewise the present invention is applicable to eliminate undesired transitory movement of a final control element in a control system incorporating only rate and proportional control actions as shown in Fig. 3 and described hereinbefore.

Figure 4:
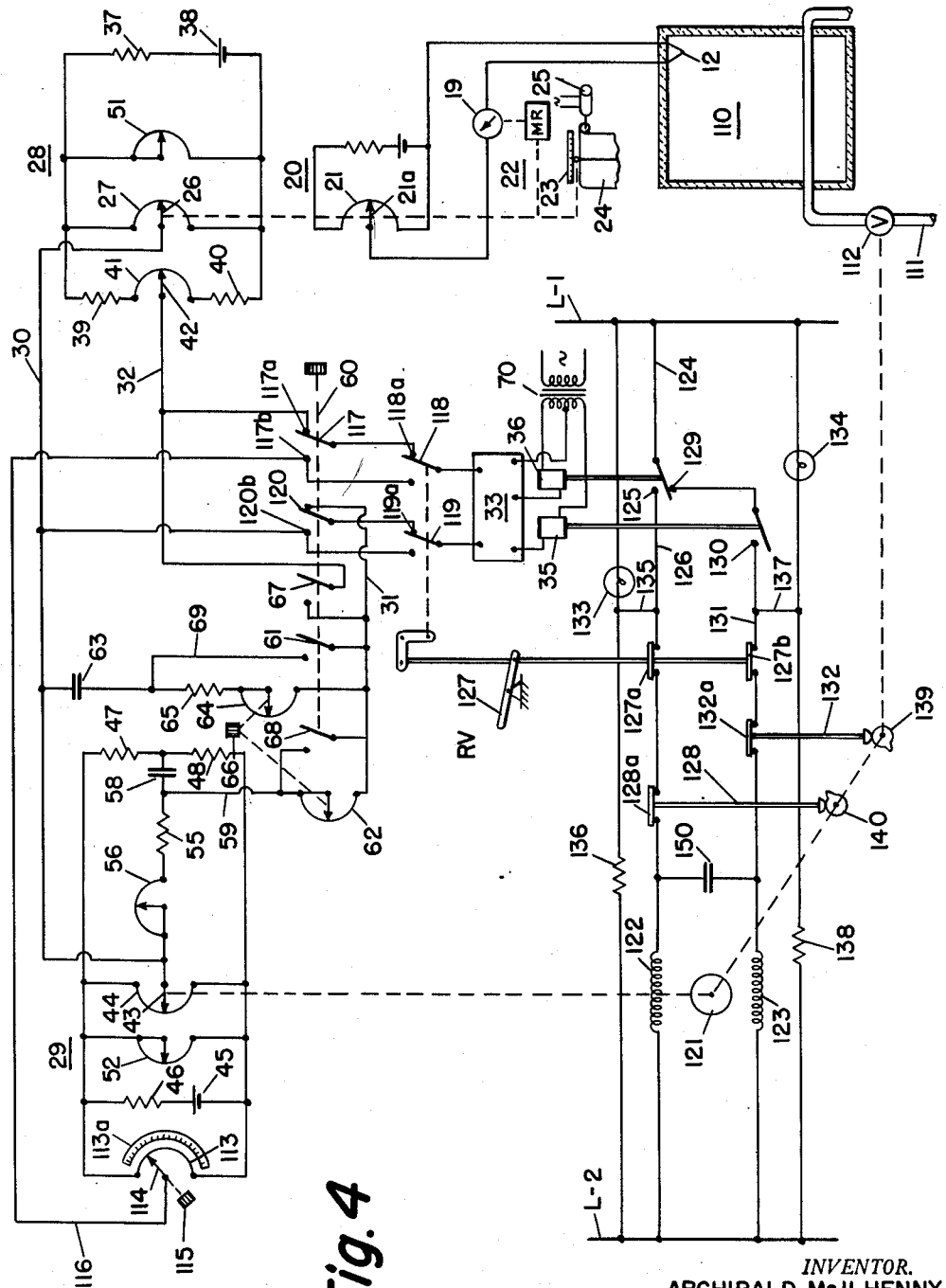
Fig. 4 is a diagrammatic illustration of another condition-controlling system to which the invention is applicable.

Reference is now made to the embodiment of the invention illustrated in Fig. 4. As there shown, the condition under control is the temperature of furnace 110 to which heat is supplied by way of pipe 111 whose flow is controlled by final control element, valve 112. In this arrangement the thermocouple 12 is positioned within furnace 110 and is interconnected to the measuring bridge network 20 of the same type as that shown in Fig. 1. Similar reference characters are used in the description of Fig. 4 as those used in Fig. 1 wherever the elements and functions are identical to those in the arrangement of Fig. 1.

It will be observed that the principal difference in the arrangement of Fig. 4 from that described in connection with Fig. 1 is in the manual control arrangement for positioning final control element, valve 112. In the present embodiment, slidewire 113 is connected in parallel with slidewire 44. A movable contact 114 adjustable by means of knob 115 is connected to a conductor 116. Conductor 116 in turn is connected to contact 117b of switch 117 which forms a part of circuit-controller 60 so that when circuit-controller means 60 is moved to the manual position, i. e. to the left as seen in Fig. 4, one input terminal of amplifier 33 is connected to conductor 116 through contact 118a of switch 118 of "read-valve" switch 127, also designated as RV. At the same time, the other input terminal of amplifier 33 is connected to line 30 through contact 119a of switch means 119 of "read-valve" RV and contact 120b of switch 120 which likewise forms a part of the circuit-controller means 60 and is operable therewith. Accordingly, it will be seen that the output of amplifier 33 is arranged to be controlled either automatically or manually, dependent upon the position of circuit-controller means 60.

With circuit-controller 60 positioned to the left for manual control of amplifier 33, motor 121 and valve 112, there is provided a simple bridge network including slidewires 44 and 113 which applies through conductors 116 and 30 the unbalanced voltage thereof to amplifier 33. This unbalanced voltage will provide a manually adjustable proportional mode of control since adjustable contact 43 is moved in conjunction with movements of motor 121 and valve 112. In other words, the position assumed by motor 121 and valve 112 will be made to correspond within the capabilities of a proportional mode control to the position of adjustable contact 114 on slidewire 113.

Control of motor 121 by amplifier 33 in the arrangement of Fig. 4 is produced in a manner somewhat similar to that shown in Fig. 1, except that motor 121 in the present arrangement is of the alternating-current type. The direction of rotation of motor 121 is dependent upon the energization of coils 122 and 123 under control of relays 35 and 36 which are connected to a transformer 70 in manner similar to that described in Fig. 1. When the polarity of the input signal, whether due to automatically or manually applied input potentials appears across the input terminals of amplifier 33, one of the relays will be energized, for example, relay 36, to connect motor winding 122 between alternating current supply lines L-2 and L-1 by way of conductor 124, contact 125 of relay 36, conductor 126, contacts 127a of "read-valve" switch 127, contacts 128a of a limit switch 128 to one side of winding 122 and thus to the other supply line L-2. At the same time winding 123 is energized from line L-1 through capacitor 150 to supply the necessary field of another phase.

When the input signal to amplifier 33 is of polarity to energize relay 35 to connect motor winding 123 to supply line L-1, such connection is made by way of conductor 124, contact 129 of relay 36, contact 130 of relay 35, conductor 131, contacts 127b of switch 127, contacts 132a of limit switch 132 to one side of winding 123, while the other side of that winding is connected directly to line L-2. In manner similar to that mentioned above, motor winding 122 is energized from line L-1 through capacitor 150. Associated with the relays 35 and 36 are signal lights 133 and 134 which as indicated are normally energized. The signal light 133 is energized through a circuit which may be traced from line L-1 by way of signal light 133, conductors 135 and 126, contacts 127a and 128a, and motor winding 122 to the other line L-2. The circuit thus traced is of lower resistance than that provided between light 133 and L-2 by way of resistor 136.

The other signal light 134 is normally energized by way of a circuit which may be traced from line L-1 by way of light 134, conductors 137 and 131, contacts 127b and 132a, motor winding 123 and the other supply line L-2. The circuit traced is of lower resistance than that provided through resistor 138. Both lights are normally energized to indicate that the control system is functioning within its throttling range, i. e. with the valve 112 short of its maximum open position and short of its fully closed position. When the valve 112 is moved to one limit or the other whether that be a fully closed or a fully open position, cams 139 and 140 mechanically connected with motor 121 and valve 112 serve to open limit switches 132 and 128, respectively, at the two limits of operation of the valve. Thus one or the other of signal lights 133 or 134 will be deenergized when the system is not functioning within the throttling range of the control system. Thus visual means are provided for indicating when the final control element is at one of its extremes, irrespective of whether the system is under control of either the automatic control system or through the manual adjustment of movable contact 114 on slidewire 113.

When relay 35 is energized it not only closes a circuit to energize motor winding 123 as described above, but it also completes a short circuit around signal light 134 thereby extinguishing it. Thus, there is provided visual indication of the energization of the motor for rotation in one direction. Similarly, the closure of the motor circuit by relay means 36 extinguishes the signal light 133 to indicate visually the opposite rotation of motor 121. If the system should be in a condition of oscillation, i. e. with motor 121 being energized for rotation first in one direction and then in the other, the relays 35 and 36 will be operated rapidly between open and closed positions causing lights 133 and 134 to blink. The alternate flashing of these lights indicates the presence of oscillation in the system which ordinarily can be suppressed by reducing the gain of amplifier 33 by a suitable gain control provided therefor. Blinking of only one light indicates normal automatic control of the operation of motor 121.

With the automatic-manual circuit-controller means 60 in the position shown in Fig. 4, provision is made for determining the position of the final control element valve 112. Such indication is desirable particularly when the valve is remotely located from the control system. To accomplish this determination of valve position the "read-valve" switch 127 is operated to throw switches 118 and 119 to the left of the position shown in Fig. 4. Such operation of switch 127 causes contacts 127a and 127b to be opened to disable the motor windings 122 and 123 and simultaneously to connect the input terminals of amplifier 33 across lines 116 and 30. The signal lights 133 and 134 at such time will be energized through the circuits including resistors 135 and 138, respectively. If the voltage or potential between line 30, which it will be remembered is connected to the valve-positioned contact 43, and line 116 is not zero, the amplifier will immediately energize one or the other of relays 35 and 36. One of the signal lights 133 or 134 will be extinguished by reason of the short-circuiting action of one of the relays, thus indicating which relay has been energized. The contact 114 will then be adjusted along slidewire 113 by manipulation of control knob 115 until the input to the amplifier is zero. When such input is zero, both of lights 133 and 134 will be energized, since both relays 35 and 36 are deenergized. By means of a scale 113a associated with slidewire 113 the position of the contact 43 relative to slidewire 44 can be read upon scale 113a, thus giving an indication of the position of the valve-actuating mechanism and of the valve 112.

With the control system shown in Fig. 4, it will be apparent that the circuit-controller 60 in addition to operating switch means 117 and 120 as discussed hereinabove to transfer control of amplifier means 33 from manual to automatic, and vice versa, also serves to operate switch means 67, 61 and 68 to complete the circuit connections of the same type as those described in connection with Fig. 1. It will be remembered that switches 61, 67 and 68 provide circuit connections for applying voltage $E_1$, developed from network 28, between lines 30 and 32 directly across rate capacitor 63 and reset resistors 55 and 56. Simultaneously, the voltage $E_1$ from network 28 and the voltage $E_2$ generated in network 29 in response to the variations in the position of the final control element are both applied to reset capacitor 58. Accordingly, it will be seen that so long as control of motor 121 and valve 112 is by manual means including the adjustable arm 114, there will be applied to the resistance-capacitance network $E_1$, the voltage generated in network 28. This R–C network is also connected to the network 29 and immediately upon return to automatic control, the signal at the input terminals of amplifier 33 will be substantially zero. Any departure from zero signal at the input to amplifier 33 after return of circuit controller 60 to the position shown in Fig. 4 will then be due entirely to normal automatic control action produced by the balanceable control system including networks 28 and 29 and the resistance-capacitance network associated with network 29.

Reference is now made to Fig. 5, wherein the invention has been shown as applied to a pneumatic control system of a type fully described in McLeod Patent 2,507,606. The system is shown as being applied to the control of the temperature in furnace 200. The temperature of furnace 200 is to be taken as representative of any measured variable, the magnitude of which is to be under either automatic or manual control. As shown, the measured variable, temperature, is controlled by changing the position of a condition-controlling element, such as the valve 201, connected in a fuel supply line 201a leading to furnace 200. Provision is made for opening valve 201 to any desired extent by means of a pneumatic operator, or actuator, 202 having a diaphragm 203 and an opposing spring 204. The temperature of the furnace is measured by means of a measuring circuit including a thermocouple 205 suitably positioned in the furnace and electrically connected to a potentiometer network 206 and a galvanometer coil 207. While any suitable measuring arrangement may be utilized, that shown includes a mechanical relay 208 operable under the control of galvanometer 207, details of which will be found in the previously mentioned Squibb Patent No. 1,935,732. Upon change of the temperature of furnace 200, the mechanical relay 208 adjusts the slidewire of the potentiometer network 206 to restore balance of the measuring network and through mechanical connection 209 and associated gearing 210, adjusts the position of a baffle 211 relative to a nozzle 212 in a pilot unit 213. The air pressure applied against diaphragm 203 is under the control of the pneumatic control system and varies with change of position of baffle 211 relative to nozzle 212 in manner now to be described.

Air is delivered by way of a supply pipe or line 199, a pressure regulator 214, passageway 215 and a restriction 216 located within a bellows 217, the interior of the bellows being connected by a pipe 218 to nozzle 212. The bellows 217 forms a part of a pneumatic relay, or booster, 221 which also includes bellows 220 and 219. All three bellows are mounted between a stationary base 222 and a movable lower plate 223, pivotally supported from the base member 222 as by a flexible hinge or leaf spring 224. A tension spring 225 is adjustable by means of a nut 226 to vary the force applied to plate 223. As fully explained in said McLeod patent, the booster 221 serves to apply to an outlet pipe line 227 air pressure which is a magnification of the air pressure existing in pipe line 218. Thus, as baffle 211 is moved away from nozzle 212, there will be a decrease in pressure in pipe 218 and a correspondingly greater decrease in the pressure in pipe 227 and vice versa.

Associated with the baffle 211 is an arm 240 pivoted at 241 and against which are disposed a reset bellows 242 and a proportional bellows 243. If only the bellows 243 were associated with lever 240 there would be present only a proportional-position action, i. e. a control action which has a continuous linear relationship between the value of the controlled variable and the position of the final control element, valve 201. However, by providing bellows 242 subjected to the same pressure as bellows 243, but through a restriction such as throttling valve 244, there is eliminated the droop, or offset, which is an inherent characteristic of any proportional-position control system. The result of the reset action due to bellows 242 is that valve 201 will be automatically adjusted to overcome the droop or offset which would otherwise be present.

By including a restriction, such as throttling valve 245, in the connection between the proportional bellows 243 and line 227, the negative feed-back action on the baffle 211 is attenuated during periods when the pressure in line 227 is undergoing change. This attenuation results in the introduction of rate action into the operation of the system for the same purpose as discussed in connection with the electrical systems disclosed and described in Figs. 1 to 4.

Whenever the control system is upset as by a change in the material processing requirements, it may be desirable to place the controlled variable under manual control. Accordingly, there is provided circuit-controlling means including valves 250, 251, 252 and 253. Valves 250, 251, 252 and 253 are preferably of the on-off type. Simultaneous with the opening of valves 250, 251 and 252 to connect the control-responsive means or pneumatic operator 202 for manual control, valve 253 is closed to prevent introduction of the automatically produced control signal pressure from line 227 into actuator 202. When valves 250, 251 and 252 have been operated to their open position and valve 253 to its closed position, provision is made for operating actuator 202 by a manually variable air pressure supplied to the actuator 202 by way of line 255, throttling valve 256, valve 250 and lines 257 and 258. It will be apparent that the motion of the final control element, valve 201, will be in accordance with the pressure determined by the manual control means, valve 256.

In accordance with the present invention, provision is made for assuring that the pressure-responsive means, actuator 202 has applied thereto the same pressure from line 227 as that supplied from valve 256 when transfer is made from manual to automatic position by the operation of valve-actuating device 250a. To assure that the output pressure of the automatic control system delivered by booster 221 through line 227, is the same as that applied to pipe 258 and actuator 202 by manually applied air pressure, there is supplied to the reset storage capacity including the reset bellows 242 and tank 259, a signal pressure representative of the manually supplied signal pressure and the deviation of the controlled quantity from the control point. Such pressure is applied to the reset bellows 242 and tank 259 by line 260, through valve 252 and line 261 which is interconnected with a nozzle 262, bellows 263 and air supply line 190 through throttling valve 264. Nozzle 262, bellows 263 and throttling valve 264 form a part of a pneumatic relay 265. The pressure developed in line 261 is primarily under the control of nozzle 262 which is arranged to cooperate with a balanceable lever 266 mounted for rotation about a pivot point 267. The movement of lever 266 is controlled to maintain the pressure in line 261 at a value corresponding to the algebraic sum of the pressure applied manually and a pressure representative of the condition under control. The manually applied pressure is introduced into the balanceable system by bellows 268 through extension line 257, while the control pressure representative of the condition under control is introduced by bellows 269 interconnected to another booster unit 221a, similar to booster unit 221. Booster unit 221a is in turn connected to a pilot unit 213a, similar to pilot unit 213. However, pilot unit 213a is provided with only a single bellows 243a operating against lever arm 240a to oppose the adjustment of baffle 211a in response to movement thereof by gearing 210a operable by mechanical relay 208. It will be noted that since there is no reset bellows provided in pilot unit 213a that the output of booster unit 221a will be proportional to the value of the condition under control, i. e. the temperature of furnace 200. Relay 265 accordingly provides a system for introducing a pressure to the reset capacity means which is the algebraic sum of the pressures representative of the position of the final control element, valve 201, and the magnitude of the condition under control, since bellows 268 is responsive to the position of valve 201 and bellows 269 is responsive to the magnitude of the condition under control. Both bellows 268 and 269 are arranged to rotate lever arm 266 in a clockwise direction upon increase in pressures therein. Such increases in pressure of either bellows 268 or 269 will produce an increased pressure in feedback bellows 263 by movement of lever 266 closer to nozzle 262. This increase in pressure is likewise applied to the reset capacity means 242 when valve 252 is operated to the manual position.

During the time that the valve is being controlled manually, the pilot unit 213 and booster 221 continue to function automatically to maintain the pressure across reset valve 244 of magnitude dependent upon the deviation of the controlled condition from the control point. However, since the pressure on the reset capacity means is the sum of the deviation and of the manually controlled pressure applied to actuator 202, the pressure in line 227 is at all times during manual control equal to the manually controlled pressure on actuator 202. With the pressure in line 227 the same as that manually applied to actuator 202, there will be no movement of the valve 201, due solely to the transfer from manual to automatic control means.

Accordingly, when it is desired to return from manual to automatic control of pressure-responsive actuator 202, control knob 250a may be turned to the position shown in Fig. 5 thereby closing valves 250, 251 and 252 and reopening valve 253 to connect line 258 to line 227.

It will be apparent to those skilled in the art that numerous modifications and changes may be made in the systems shown and described without departing from the invention. Among such modifications it has been found in practice that in the embodiments shown in Figs. 1 and 4, the conductor 69 connected between rate capacitor 63 and fixed resistor 65 may be connected between slidewire 64 and fixed resistor 65. This connection is possible where the value of fixed resistor 65 is small enough so that the time required to charge capacitor 63 through resistor 65 is not appreciably affected. Typical values of the components of this circuit in one successful embodiment were as follows:

| | | |
|---|---|---|
| Capacitor 63 | mfd | 24 |
| Resistor 65 | ohms | 15,000 |
| Slidewire 64 | do | 0–200,000 |
| Slidewire 62 | megohms | 0–50 |

While preferred embodiments of the invention have been illustrated and described, it is to be understood that further modifications may be made within the scope of the appended claims.

What is claimed is:

1. A balanceable control system for maintaining the magnitude of a condition at a predetermined value representing a selected control point comprising a condition-varying element, control signal responsive means for automatically operating said condition-varying element in a direction to maintain said condition at said predetermined value, means operable in response to changes in the magnitude of said condition to produce a first control signal, storage capacity means for modifying the operation of said signal-responsive means in accordance with a time function of the departure of said condition from said control point, manual means for controlling said condition-varying element, and means for transferring control of said condition-varying element between said signal responsive means and said manual means, said control transferring means including means for continuously applying to said capacity means during manual control at least a first control quantity variable in response to said first control signal in avoidance of abrupt departures in the position of said condition-varying element upon return of control to said signal-responsive means.

2. A balanceable control system for maintaining the magnitude of a condition at a predetermined value representing a selected control point comprising a condition-varying element, control signal responsive means for automatically operating said condition-varying element in a direction to maintain said condition at said predetermined value, means operable in response to changes in the magnitude of said condition to produce a first control signal, storage capacity means for modifying the operation of said signal-responsive means in accordance with a time function of the departure of said condition from said control point, manual means for controlling said condition-varying element, and means for transferring control of said condition-varying element between said signal responsive means and said manual means, said control transferring means including means for continuously and simultaneously applying to said capacity means during manual control a first control quantity variable in response to said first control signal and a second control quantity variable in response to movement of said condition-varying element in avoidance of abrupt departures in the position of said condition-varying element upon return of control to said signal-responsive means.

3. In a control system having an amplifier responsive to changes in an electrical quantity applied to its input terminals for controlling the adjustment of a compensating means upon deviation of a condition under control, the combination comprising a first source of voltage adjustable in response to deviation of said condition under control from a predetermined value to produce a first electrical quantity, a second source of voltage adjustable with adjustment of said compensating means, a resistor-capacitor network connected to said second source of voltage for developing a second electrical quantity, means for connecting one output terminal of said network to an input terminal of said amplifier and the other output terminal of said network to an output terminal of said first source of voltage, and circuit-controlling means for selectively interconnecting the other output terminal of said first source of voltage to the other terminal of said amplifier for automatic control of said compensating means thereby and to the first-named input terminal of said amplifier to apply said first electrical quantity to a capacitor of said network when said compensating means is controlled by means other than by said amplifier.

4. The combination as set forth in claim 3 in which said network includes a reset resistor and a reset capacitor.

5. The combination as set forth in claim 3 in which said network includes a rate resistor and a rate capacitor.

6. The combination as set forth in claim 3 in which said network includes a reset resistor, a reset capacitor, a rate capacitor and a rate resistor and said circuit-controlling means includes switch means operative to short-circuit said rate resistor when said first source of voltage is connected to said network.

7. A control system having an amplifier to the input circuit of which there is applied an electrical potential, said control system being characterized by the provision of a reset resistor connected to said input circuit for developing another electrical potential opposing the first-named potential, a source of voltage adjustable in accordance with change in the output of said amplifier, a circuit between said reset resistor and said source of voltage including a path having therein a reset capacitor, and circuit-controlling means for simultaneously short-circuiting the input of said amplifier and connecting said first and second electrical potentials across said reset resistor to maintain the voltage across said reset capacitor at a value such that upon operation of said circuit-controlling means to its original position, the algebraic sum of said first and second electrical potentials in the input circuit of said amplifier is substantially zero.

8. A system for transferring between automatic and manual adjustment of a compensating means with minimum disturbance of the compensating means upon return from manual control to automatic control comprising an amplifier responsive to the differences between two electrical signals, one of which varies in response to deviations of a variable characteristic from a control point and the other of which varies in accordance with the output of a resistance-capacitance network, said network being connected across an adjustable source of voltage variable in response to adjustment of said compensating means, and circuit-controlling means for selectively connecting said one electrical signal to one terminal of said amplifier for automatic control of said compensating means or to an output terminal of said network during manual control of said compensating means so that said capacitance has applied thereto during manual control of said compensating means at least said one electrical signal.

9. A system in accordance with claim 8 in which said network includes a reset resistance and a reset capacitance.

10. A system in accordance with claim 8 in which said network includes a rate resistance and a rate capacitance.

11. A system in accordance with claim 8 in which said network includes a reset resistance, a reset capacitance, a rate resistance and a rate capacitance, and said circuit-controlling means includes means for short circuiting said rate resistance during manual operation of said compensating means.

12. In a system for automatically adjusting a compensating means in a direction to return the magnitude of a variable characteristic toward a control point upon deviation therefrom, the combination comprising an amplifier responsive to the difference between two potential differences, means for varying the first of said potential differences in accordance with deviation of said characteristic from the control point, a source of voltage variable upon change in adjustment of said compensating means, a resistance-capacitance network for developing said second potential difference connected in circuit with said source of voltage, said network including a reset capacitor and a reset resistance, operating means for adjusting said compensating means in accordance with the output of said amplifier, first circuit-controlling means for applying both of said potential differences to said reset capacitor during operation of said compensating means under manual control and second circuit-controlling means simultaneously operable with said first circuit-controlling means for disabling the input circuit of said amplifier whereby upon operation of said first and second circuit-controlling means to return said system to automatic control for adjustment of said compensating means in response to said amplifier there will be minimum disturbance of said compensating means.

13. In a balanceable control system of the type including a first network having a circuit element adjustable to produce a signal in accordance with the magnitude of a condition, a second network including an adjustable circuit element, condition-varying means operable in response to the unbalance between said networks for varying the magnitude of said condition to maintain it at a predetermined value, a connection between said condition-varying means and said adjustable element of said second network for operating it in a system-balancing direction, said second network including a reset resistor, a reset capacitor, a rate capacitor and a rate resistor, an output circuit connected between the end of the rate resistor adjacent said rate capacitor and an output terminal of said first network, a connector extending from the other output terminal of said first network to the opposite side of said rate capacitor, means connected to said output circuit and to said condition-varying means for controlling the latter in accordance with signals applied to said output circuit, means for preventing operation of said last-named means comprising a circuit controller for connecting said rate capacitor and said reset resistor directly across said output terminals of said first network, said rate capacitor then having applied to it at all times a voltage corresponding to the signal produced in said first network whereby upon operation of said circuit controller to its original position the voltage of said rate capacitor produces a signal equal and opposite to said signal of said first network to prevent adjustment of said condition-varying means until after the voltage on said rate capacitor deviates from a value equal to the unbalance voltage which existed across the output terminals of said first network at the time of operation of said circuit controller.

14. In a balanceable control system of the type comprising a first network including a circuit element adjustable to unbalance its network in accordance with change in the magnitude of a condition, a second network including an adjustable circuit element, condition-varying means operable in response to the unbalance between said networks for varying the magnitude of said condition to maintain it at a predetermined value, a connection between said condition-varying means and said adjustable element of said second network for operating it in a system-balancing direction, said second network including a reset resistor and a reset capacitor, a rate capacitor and a rate resistor connected in series across said reset resistor, an output circuit connected between the end of the rate resistor adjacent said rate capacitor and an output terminal of said first network, a connector extending from the other output terminal of said first network to the other side of said rate capacitor, amplifier means having an input circuit connected to said output circuit for controlling said condition-varying means in accordance with signals applied to said input circuit, means for preventing operation of said amplifier means and said condition-varying means in response thereto comprising a circuit controller for connecting one side of said reset capacitor directly to one of said output terminals of said first network, said reset capacitor then having applied to it at all times a voltage corresponding to the unbalance voltage of said first network so that upon operation of said circuit controller to its original position the voltage at the output terminals of said second network is equal and opposite to the voltage at the output terminals of said first network to prevent adjustment of said condition-varying means until after the voltage across said reset capacitor deviates from a value equal to the voltage which existed across said output terminals of said first network at the time of operation of said circuit controller.

15. A balanceable control system for maintaining the magnitude of a condition at a predetermined value representing a selected control point comprising a condition-varying element, a control signal responsive means for automatically operating said condition-varying element in a direction to maintain said condition at said predetermined value, a first means operable in response to changes in the magnitude of said condition to produce a first control signal, storage capacity means for modifying the operation of said signal responsive means in accordance with a time function of the departure of said condition from said control point, a second means for operating said condition-varying element independently of change in magnitude of said first control signal, transfer means for transferring control of said condition-varying element between said first means and said second means, and means operable under the control of said transfer means for applying to said capacity means at least a control quantity of magnitude dependent upon that of said first control signal to predetermine the effectiveness of said capacity means in modifying the operation of said signal responsive means upon return of control to said first means.

16. In a system for automatically adjusting a compensating means in a direction to return the magnitude of a variable characteristic toward a control point upon deviation therefrom, the combination comprising an amplifier responsive to the difference between two potential differences, means for varying the first of said potential differences in accordance with deviation of said characteristic from said control point, a source of voltage variable upon change in adjustment of said compensating means, a resistance-capacitance network for developing said second potential difference connected in circuit with said source of voltage, said network including a reset capacitor and a reset resistance, operating means for adjusting said compensating means in accordance with the output of said amplifier, means for controlling the operation of said operating means, transfer means for placing said operating means under the control of said controlling means for adjustment of said compensating means independently of the magnitude of said first potential difference, said transfer means including circuit controllers for applying both of said potential differences to said reset capacitor, prior to operation of said transfer means to return the control of said operating means in accordance with said first potential difference, initially to minimize the adjustment of said compensating means as a result of the operation of said transfer means.

17. In a balanceable control system of the type comprising a first network including a circuit element adjustable to unbalance its network in accordance with change in the magnitude of a condition, a second network including an adjustable circuit element, condition-varying means operable in response to the unbalance between said networks for varying the magnitude of said condition to maintain it at a predetermined value, a connection between said condition-varying means and said adjustable element of said second network for operating it in a system-balancing direction, said second network including a reset resistor and a reset capacitor, a rate capacitor and a rate resistor connected in series across said reset resistor, an output circuit connected between the end of the rate resistor adjacent said rate capacitor and an output terminal of said first network, a conductor extending from the other output terminal of said first network to the other side of said rate capacitor, amplifier means having an input circuit connected to said output circuit for controlling said condition-varying means in accordance with signals applied to said input circuit, means for controlling operation of said condition-varying means independently of said output circuit, means for transferring operation of said condition-varying means from said output circuit to said control means including a circuit controller which connects one side of said reset capacitor directly to one of said output terminals of said first network prior to the operation of said transfer means to restore operation of said condition-varying means under the control of said output circuit, said reset capacitor before said restoration having applied to it a voltage including the unbalance voltage of said first network so that upon operation of said circuit controller to its original position the voltage at the output terminals of said second network is equal and opposite to the voltage at the output terminals of said first network to prevent adjustment of said condition-varying means until the voltage across said reset capacitor is changed.

References Cited in the file of this patent

UNITED STATES PATENTS

| Number | Name | Date |
|---|---|---|
| 2,175,985 | Callender et al. | Oct. 10, 1939 |
| 2,429,642 | Newton | Oct. 28, 1947 |
| 2,621,315 | Cuckler | Dec. 9, 1952 |
| 2,644,642 | Smoot | July 7, 1953 |